Oct. 19, 1965  J. M. RIVERO OLMEDO  3,212,339
METER BOXES AND METER MOUNTINGS
Filed Aug. 8, 1963
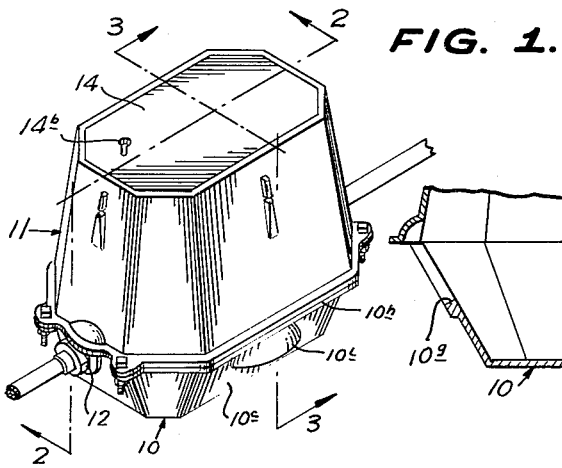
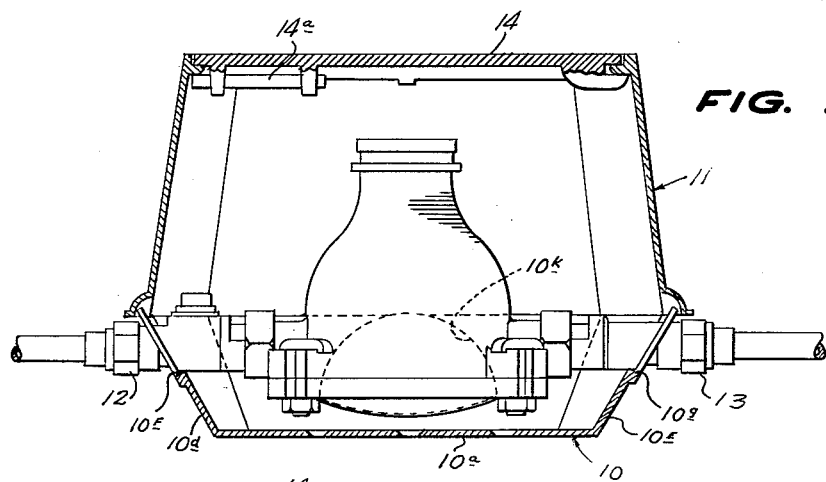
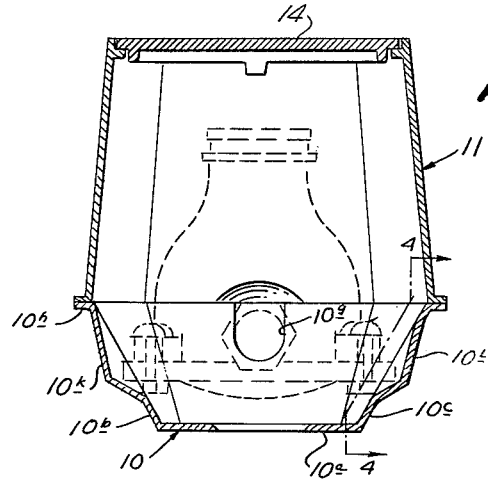
INVENTOR.
JOSE M. RIVERO OLMEDO
BY
ATTORNEY.

3,212,339
METER BOXES AND METER MOUNTINGS
José M. Rivero Olmedo, 1469 Wilson Ave., Santurce,
San Juan, Puerto Rico
Filed Aug. 8, 1963, Ser. No. 301,701
1 Claim. (Cl. 73—431)

The present invention relates to water meter boxes of the type to be installed outdoors flush with the surface of the ground. Cast iron is conventionally the material of which such meter-housing boxes are made because of its resistance to destruction by the corrosive effect of ground water in the imbedding soil. Cast iron, is however, a brittle material and requires substantial thickness if castings thereof are to resist chipping and crushing strains.

It is the primary object of this invention to provide a design for such cast iron water meter boxes which will permit thin, light weight construction yet avoid the normally concomitant proneness thereof to chipping strains experienced in water meter installation and the subsequently to be experienced crushing strains of vehicles, lawn mowers, etc., traversing same.

Further objects and advantages of my construction design will appear to those experienced in the art after familiarization with the detailed description of the preferred embodiment to follow.

Referring to the accompanying drawing:

FIGURE 1 is a perspective view of a meter box embodying the present invention and containing a water meter, only portions of the water line fittings for which are exposed and visible;

FIG. 2 is a longitudinal sectional view of the box, taken on the line 2—2 of FIGURE 1, and showing the conventional water meter housed therein;

FIG. 3 is a transverse sectional view of the box taken on the line 3—3 of FIGURE 1; and FIG. 4 is a detail sectional view of a fragmentary portion of the meter box, said view being taken on the line 4—4 of FIGURE 3 and drawn to an enlarged scale better to show the meter-supporting and rotation-resisting embossment integrally formed into each side wall section of the meter-underlying tray section.

Throughout the several views, the same reference numerals refer to the same parts.

Referring more particularly to the drawings, my invention finds its preferred embodiment in a meter box of three-piece construction consisting of a bottom tray 10 having a polygonal base portion 10a, with upwardly flaring side walls 10b, 10c, and upwardly flaring end walls 10d, 10e, defining flanged top edge 10h lying in a plane parallel to the plane of the tray base 10a. The end walls 10d, 10e are provided with diametrically oppositely disposed notches 10f and 10g into which are respectively receivable the usual valved inlet and the outlet water line fittings 12, 13 between which are service-assembled the integrally cast spuds of a conventional pear-shaped water meter. The waterline fittings may be of any of the straight or angled widely-varied forms common to this art specifically and to the plumbing trade generally.

The cover 14 for the meter box is of generally plane polygonal shape corresponding roughly to the polygonal shape and dimensions of the tray base 10a, and is provided with a locking bolt 14a, operable by a key (not shown) insertable through a keyhole 14b. The cover 14 is supportable above the meter head by a tall bezel or collar member 11, the lower edge of which is flanged to lie upon the flange 10h, of the tray and be secured against separation therefrom by conventional fasteners such as threaded bolts and nuts.

When the water meter is assembled with the inlet and outlet waterline fittings 12, 13, and the cover-lid receptive collar member 11 is bolted to the tray 10, the fittings 12 and 13 are captive in the notches 10f and 10g, and are allowed some endwise movement but little, if any, lateral and vertical movement therein. To relieve the notch walls of meter-supporting strain and also to maintain the water meter body and its inlet and outlet spuds above the tray's base 10a, the sidewall 10b and sidewall 10c of the tray are each formed with an embossment 10k and 10l, respectively, which is complementary to a cheek of the water meter and jointly therethrough positively support the meter at a slight elevation or "finger-spacing" above the tray base 10a. The embossments 10k and 10l thus very appreciably facilitate couple-up of the meter to the water lines, for the parts are practically self-aligned when housed and the installer is spared the finger-crushing experience of holding up the meter with one hand while attempting to thread on the water line fitting with the other hand. Similarly, the provision of ample working space beneath and at the top and sides of the water fitting portions lying within the meter box confines is, by virtue of the meter-cheek-contacting wall embossments 10k, 10l, not obtained at the expense of freedom of the meter to rotate on its inlet-outlet axis during the couple-up assembly with either water line. The strain of resisting such rotation is borne almost exclusively by the side walls 10b, 10c of the tray and by the notch-closing edge flange of the collar-member 11, thus relieving the notches themselves of these strains.

I am aware that my water meter box design herein depicted is susceptible of some modification without departure from its basic inventive concepts, and that while it is especially advantageous when constructed of cast iron, other materials, cast, molded, or pressed might in some instances be used to similar advantage.

What I claim is:

A cast thin-shell water meter box for flush-with-the-ground installation, comprising: a shallow oblong tray member having a base portion generally corresponding in length and breadth to the base dimensions of the conventional pear-shaped water meter and spuds it is intended to underlie, a cover-lid receptive collar member, said tray member having circumferential upwardly-extending opposite side and end walls containing notches, said end walls terminating in a top rim complementary to and supportive of the cover-lid receptive collar member for encompassing the water meter and affording work space thereabout to enable facile manual coupling of meter spuds to waterline fittings extended through said notches in the opposite upstanding end walls of the oblong tray member, and means for supporting the so-housed water meter in elevated rotation-resisting alinement of its spuds with the water line fittings extended through the notches of the tray member end walls to afford an extended manual working space between the base portion of the tray member and the overlying meter spuds and fittings, said last-mentioned means comprising an embossment incorporated with and constituting an integral portion of each of the opposite upstanding side walls of the tray member, each embossment conforming in shape to a cheek of the base portion of the water meter and so arranged with respect thereto and each other as to support and hold the meter upright and positively preclude its turning on its spud-axis when the collar member is assembled upon the tray member, yet provide no obstruction to manual access of the meter spuds and coupled fittings.

References Cited by the Examiner
UNITED STATES PATENTS

| | | | |
|---|---|---|---|
| 2,018,615 | 10/35 | Lofton | 73—201 X |
| 2,619,837 | 12/52 | Ford | 73—201 |
| 3,111,030 | 11/63 | Whitman | 73—431 X |

RICHARD C. QUEISSER, *Primary Examiner.*

DAVID SCHONBERG, *Examiner.*